(12) United States Patent
Chauhan

(10) Patent No.: US 8,286,408 B2
(45) Date of Patent: Oct. 16, 2012

(54) METHOD AND AN APPARATUS FOR GROUPING DISCRETE LAMINAR ARTICLES INTO BATCHES OF PREDETERMINED COUNT

(75) Inventor: Vijay Chauhan, Mumbai (IN)

(73) Assignee: Parle Products Pvt. Ltd., Mumbai (IN)

( * ) Notice: Subject to any disclaimer, the term of this patent is extended or adjusted under 35 U.S.C. 154(b) by 319 days.

(21) Appl. No.: 12/829,350

(22) Filed: Jul. 1, 2010

(65) Prior Publication Data

US 2012/0000748 A1    Jan. 5, 2012

(51) Int. Cl.
 *B65B 23/14*     (2006.01)
 *B65B 57/20*     (2006.01)
(52) U.S. Cl. ............... 53/443; 53/475; 53/500; 53/542; 53/247
(58) Field of Classification Search .............. 53/443, 53/473, 475, 500, 542, 247; *B65B 23/14, B65B 57/20, 65/08*
See application file for complete search history.

(56) References Cited

U.S. PATENT DOCUMENTS

| | | | | |
|---|---|---|---|---|
| 3,000,151 A | * | 9/1961 | Winkler et al. | 53/443 |
| 4,590,743 A | * | 5/1986 | Hardage | 53/542 |
| 4,879,862 A | * | 11/1989 | Nolte et al. | 53/443 |
| 5,058,725 A | * | 10/1991 | Gamberini et al. | 198/406 |
| 5,595,280 A | * | 1/1997 | Spatafora | 198/429 |
| 6,052,969 A | * | 4/2000 | Hart et al. | 53/475 |
| 6,834,755 B2 | | 12/2004 | Jay | |
| 2003/0102200 A1 | * | 6/2003 | Vijay | 198/364 |

FOREIGN PATENT DOCUMENTS

| | | | | |
|---|---|---|---|---|
| JP | 64002934 A | * | 1/1989 | |
| JP | 02146693 A | * | 6/1990 | |

* cited by examiner

*Primary Examiner* — Stephen F Gerrity
(74) *Attorney, Agent, or Firm* — Robert Plotkin, P.C.

(57) ABSTRACT

An apparatus for grouping discrete laminar articles (hereinafter referred to as articles) into batches of predetermined count includes a feed conveyor, a left-hand screw and a right-hand screw combination (hereinafter referred to as screws), a means for synchronizing and automating starting and stopping rotation of the screws and a platform assembly. The platform assembly is connected to the feed conveyor and includes a hatch and a pusher mechanism. The feed conveyor supports articles disposed thereon. The screws are disposed along edges of and at either side of the feed conveyor and are adapted to rotate to facilitate counting and pushing of the articles. The screws stop rotating and thereby stop further pushing of the articles, when a predetermined count of articles has been pushed. The pusher mechanism receives the predetermined count of articles pushed by screws and moves them to the hatch from where they are dropped into delivery line.

8 Claims, 4 Drawing Sheets

METHOD AND AN APPARATUS FOR GROUPING DISCRETE LAMINAR ARTICLES INTO BATCHES OF PREDETERMINED COUNT

CROSS-REFERENCE TO RELATED APPLICATIONS

This application claims priority under 35 U.S.C. §119 from Indian Patent Application Number 1568/MUM/2009, filed on Jul. 2, 2009, entitled, "A Method and an Apparatus for Grouping Discrete Laminar Articles into Batches of Predetermined Count."

FIELD OF THE INVENTION

This invention relates to methods and apparatuses for handling discrete laminar articles such as biscuits along production lines, more particularly, the present invention relates to a method and apparatus for forming batches of biscuits.

BACKGROUND OF THE INVENTION

Automated biscuit making process involves four basic stages namely mixing, forming, baking and packing. Once mixing, forming and baking operations are completed, the biscuits thus formed leave the baking oven in a continuous flow, along one or a plurality of supply-lines/chutes, with biscuits upstanding about edges thereof and abutted against one another. For some types of biscuits and packaging, it is necessary to create appropriate batches out of the biscuits traveling along the supply line. Such batches or arrays consist of a predetermined number of biscuits. After forming batches out of the biscuits traveling along the supply line, these batches are delivered to a wrapping or boxing mechanism to perform packaging thereof into separate packages.

Some prior-art methods and apparatuses for grouping discrete laminar articles such as biscuits into batches of predetermined count are known. The methods and apparatuses for forming such batches and transferring such batches to the delivery lines are known to cause and face considerable difficulties and inconveniences along the production lines. For example, the thicknesses of the biscuits being manufactured by the automated biscuit making process vary during the course of production. Due to variation in the thickness of the biscuits, there is every chance of miscount during formation of batches thereby, resulting in batches of non-uniform sizes that is undesirable. Further, there is every possibility of breakage or crushing of the biscuits along edges thereof, due to shearing action between the biscuits and the apparatuses used for forming batches and transferring the batches during handling of such batches.

The existing methods and apparatuses overcome the difficulties faced by the prior-art methods and apparatuses for grouping discrete laminar articles such as biscuits into batches of predetermined count. However, such existing equipment operates at low speed or takes up too much space. Further, existing apparatuses used for forming batches of biscuits and transferring the batches make use of pressure-less feeders in order to restrain damage to the biscuits, while being handled by the existing apparatuses. However, such pressures-less feeders are complicated and expensive.

Accordingly, there is felt a need for a method and an apparatus for grouping discrete laminar articles such as biscuits into batches of predetermined count that overcomes the drawbacks associated with the prior art as well as existing methods and apparatuses and that can be effectively used in production lines.

OBJECTS OF THE INVENTION

An object of the present invention is to provide a method and apparatus for precisely grouping discrete laminar articles such as biscuits into batches of predetermined count.

Another object of the present invention is to provide a compact apparatus for forming batches.

Still another object of the present invention is to provide an apparatus for forming batches that is sturdy and stable in construction.

Another object of the present invention is to provide an apparatus for rapidly forming batches of predetermined count.

Still another object of the present invention is to provide an apparatus for forming batches that safely handles discrete laminar articles such as biscuits without causing any damage or breakage thereof while being handled along production lines.

Yet another object of the present invention is to provide a method and an apparatus for forming batches of discrete laminar articles such as biscuits of any size or shape.

Another object of the present invention is to provide a method and an apparatus for forming batches that is adapted to control and accurately maintain spacing between the batches.

Still another object of the present invention is to provide a method and an apparatus for forming batches that increases productivity.

Another object of the present invention is to provide an apparatus for forming batches that reduces work of process control and quality control departments.

Still another object of the present invention is to provide an apparatus for forming batches that reduces manual monitoring and supervisory tasks.

Yet another object of the present invention is to provide an apparatus for forming batches that reduces human intervention.

SUMMARY OF THE INVENTION

In accordance with the present invention there is provided an apparatus for grouping discrete laminar articles such as biscuits into batches of predetermined count. The apparatus includes a feed conveyor, a left-hand screw, a right-hand screw, a means for synchronizing and automating starting and stopping rotation of the left hand screw and the right hand screw and a platform assembly. The platform assembly is functionally connected to the feed conveyor and includes a hatch and a pusher mechanism. The feed conveyor is adapted to support and convey discrete laminar articles such as biscuits disposed thereon. The left hand screw and the right hand screw are disposed along edges of either side of the feed conveyor. The left hand screw and the right hand screw are adapted to rotate to facilitate counting and pushing of the discrete laminar articles such as biscuits. Further, the left hand screw and the right hand screw are adapted to stop rotating and thereby stop further pushing of the discrete laminar articles such as biscuits, when a predetermined count of the discrete laminar articles have been pushed. The apparatus further includes means for synchronizing and automating starting and stopping of rotation of the left hand screw and the right hand screw. The pusher mechanism of the platform assembly is adapted to receive and move the predetermined count of discrete laminar articles such as biscuits pushed by the left hand screw and the right hand screw to the hatch. The hatch of the platform assembly is adapted to receive the predetermined count of the discrete laminar articles moved by the pusher mechanism, and drop the predetermined count of the discrete laminar articles into a delivery line of a wrapping station.

In one embodiment of the present invention, the means for synchronizing and automating starting and stopping rotation of the screws is a servo-motor.

Typically, the means for synchronizing and automating starting and stopping rotation of the screws is controlled by a rotary encoder.

Further, the rotary encoder is adapted to send signals to the means for synchronizing and automating starting and stopping rotation of the screws to stop the rotation of the screws and accordingly stop further pushing of the discrete laminar articles such as biscuits, when a predetermined count of the discrete laminar articles have been pushed from the feed conveyor to the pusher mechanism of the platform assembly.

Furthermore, the rotary encoder is also adapted to send signals to the pusher mechanism to move the discrete laminar articles held therein to the hatch.

In another aspect of the present invention there is provided a method for grouping discrete laminar articles such as biscuits into batches of predetermined count. The method involves supporting and conveying discrete laminar articles such as biscuits on a feed conveyor and thereafter pushing the discrete laminar articles along the feed conveyor by rotating a left hand screw and a right hand screw disposed along edges of either side of the feed conveyor. The method further involves stopping rotation of the left hand screw and the right hand screw and accordingly stopping further pushing of the discrete laminar articles, when a predetermined count of discrete laminar articles such as biscuits have been pushed to a platform assembly functionally connected to the feed conveyor. Furthermore, the method for grouping discrete laminar articles such as biscuits into batches of predetermined count also involves synchronization and automation of starting and stopping of rotation of the left hand screw and the right hand screw. The method further involves moving the pre-determined count of discrete laminar articles held by the pusher mechanism to a hatch of the platform assembly and dropping the predetermined count of discrete laminar articles received by the hatch into a delivery line of a wrapping station.

Typically, the method involves controlling the means for synchronizing and automating starting and stopping of rotation of the screws by using a rotary encoder.

Furthermore, the rotary encoder is also used for controlling the pusher mechanism that is adapted to move to said hatch, after receiving said pre-determined count of discrete laminar articles.

BRIEF DESCRIPTION OF THE ACCOMPANYING DRAWINGS

The invention will now be described in relation to the accompanying drawings, in which.

Figure 1:
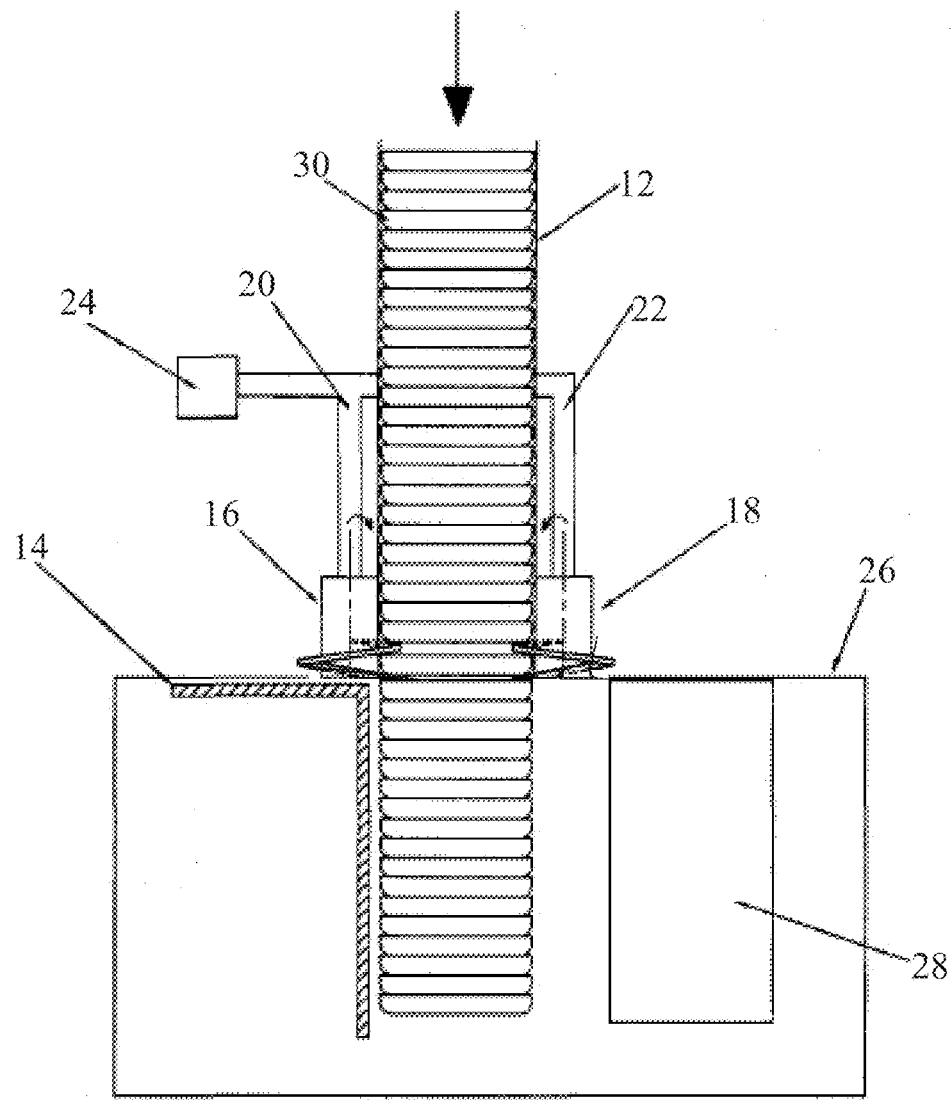
FIG. 1 illustrates a view of an apparatus used for grouping discrete laminar articles such as biscuits into batches of pre-determined count, with a pusher mechanism of the apparatus in a down-configuration in accordance with one embodiment of the present invention.
Figures 3A, 3B:
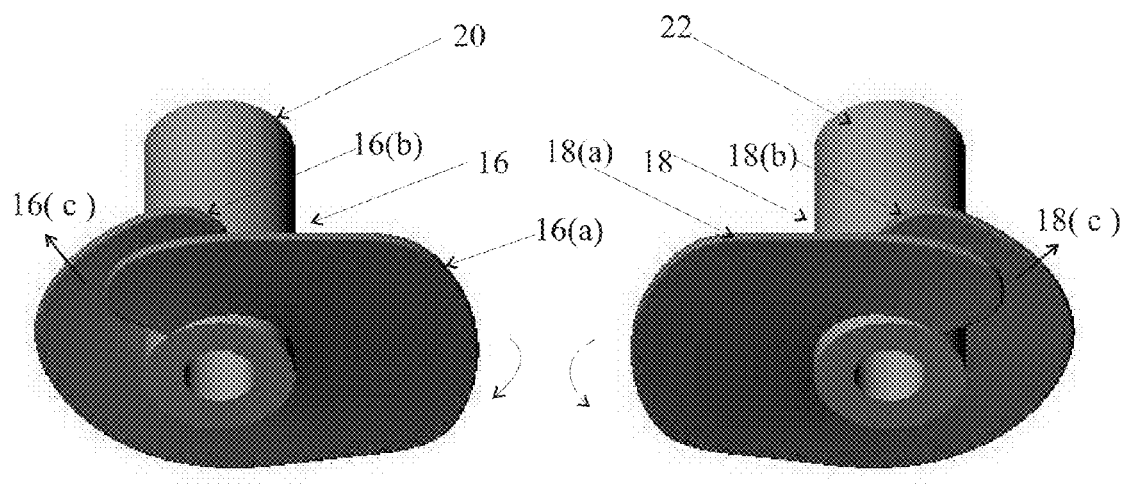
Figure 4:
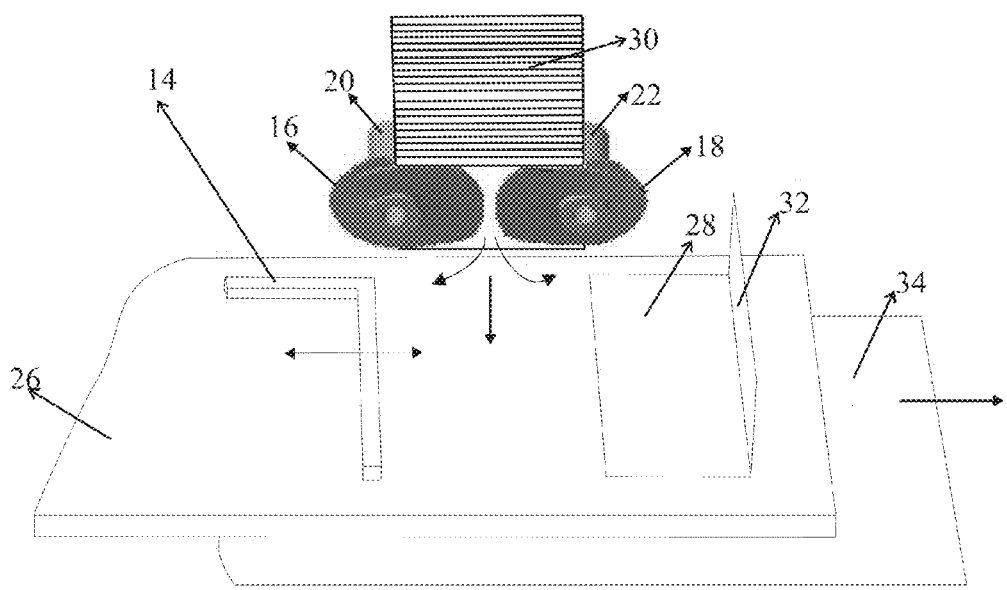

FIG. 3(a) and FIG. 3(b) illustrates perspective views of a left hand screw and a right hand screw; and FIG. 4 illustrates an isometric view of the apparatus of FIG. 1 operating along a production line of discrete laminar articles such as biscuits.

DETAILED DESCRIPTION OF THE ACCOMPANYING DRAWINGS

The present invention provides a method and an apparatus for grouping discrete laminar articles such as biscuits into batches of predetermined count (hereinafter referred to as method and apparatus respectively). More specifically, the apparatus of the present invention is adapted to precisely count the discrete laminar articles such as biscuits before forming batches there-from and transferring the batches to a delivery line of a wrapping station. Further, the apparatus of the present invention is adapted to simultaneously carry-out counting, transferring and packaging of the discrete laminar articles, thereby making the process of packaging the discrete laminar articles into separate batches quicker and convenient. Furthermore, the apparatus of the present invention ensures safe handling of the discrete laminar articles, while being counted, transferred and packaged.

Figure 2:
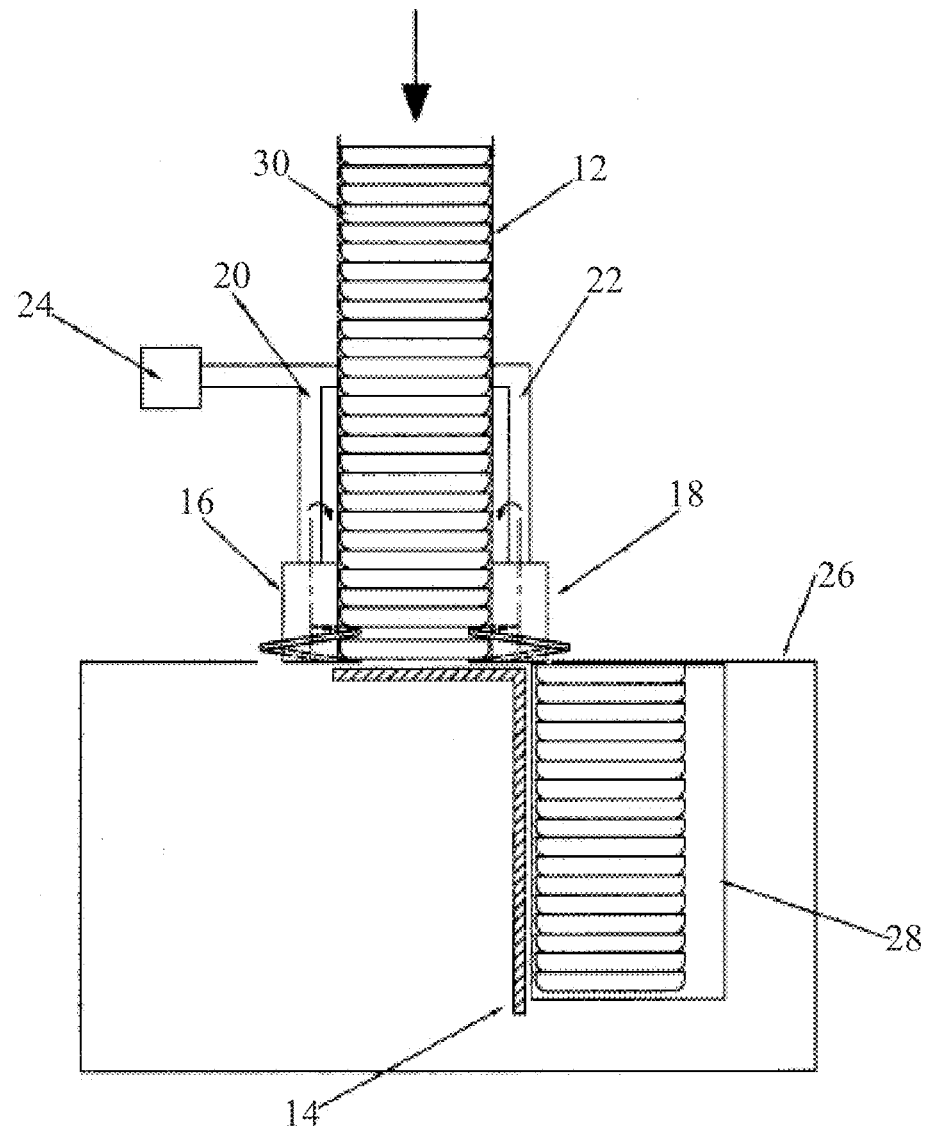
FIG. 2 illustrates another view of the apparatus of FIG. 1, with the pusher mechanism of the apparatus in an up-configuration.
Figure 2:
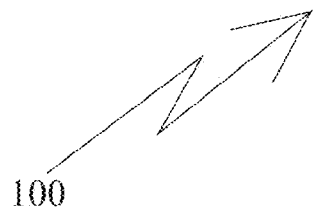

Referring to FIG. 1 and FIG. 2, the apparatus for grouping discrete laminar articles such as biscuits into batches of pre-determined count, (hereinafter referred to as apparatus 100) includes a feed conveyor 12, a right hand screw 16, a left hand screw 18, a left hand shaft 20, a right hand shaft 22, a servo motor 24, a platform assembly 26. The platform assembly includes a pusher mechanism 14, a hatch 28 and a striker plate 32 (not shown in FIG. 1 and FIG. 2).

The apparatus 100 of the present invention may be used for pushing discrete laminar articles along a feed conveyor 12 and grouping together a pre-determined count of the discrete laminar articles to form batches there-from. For example, the apparatus of the present invention may be used for moving together a predetermined count of discrete laminar articles such as biscuits, pieces of cake, bread-slices or the like to the hatch 28, from where the predetermined count of the discrete laminar articles may be dropped to a delivery line of a wrapping station for packaging the discrete laminar articles and forming a batch there-from. However, the present invention is not limited to be used in a particular production line for any particular discrete laminar article.

In accordance with an embodiment of the present invention, the feed conveyor 12 is adapted to support a plurality of discrete laminar articles such as biscuits 30 disposed thereon, wherein each of the discrete laminar articles are standing on an edge thereof and is abutting against an adjacent discrete laminar article.

The left hand screw 18 and the right hand screw 16 are located on either side of the feed conveyor 12 and are disposed along edges thereof as shown in the FIG. 1 and FIG. 2. Further, the left hand screw 18 and the right hand screw 16 are adapted to rotate to facilitate counting and pushing of the discrete laminar articles such as biscuits 30 along a length of the feed conveyor 12. The axis of rotation of the left hand screw 18 and the right hand screw 16 are parallel to the movement of the discrete laminar articles 30 along the length of the feed conveyor 12. More specifically, the right hand screw 16 is connected to the left hand shaft 20 which typically rotates in clockwise direction and the left hand screw 18 is connected to the right hand shaft 22 which typically rotates in anticlockwise direction, thereby providing inward flow of the discrete laminar articles 30 along the feed conveyor 12 and towards a receiving face of the pusher mechanism 14 of the platform assembly 26 that is in a down configuration as shown in FIG. 1. Further, the left hand screw 18 and the right hand screw 16 are adapted to stop rotating and thereby stop pushing the discrete laminar articles such as biscuits 30 along a length of the feed conveyor 12, when a pre-determined count of discrete laminar articles forming a batch has been pushed to the receiving face of the pusher mechanism 14 of the platform 26.

FIG. 3(a) and FIG. 3(b) of the accompanying drawings illustrates perspective views of the left hand screw 18 and the right hand screw 16. The adjacent crests 16(a) and 16(b) of the threads provided on the right hand screw 16 and the adjacent crests 18(a) and 18(b) of the threads provided on the left hand screw 18 are respectively adapted to accommodate a lower edge portion and an upper edge portion of a discrete laminar article belonging to the batch. The space between the adjacent crests 16(a) and 16(b) of the threads provided on the right hand screw 16 is referred to as pitch 16(c). The space between the adjacent crests 18(a) and 18(b) of the threads provided on the left hand screw 18 is referred to as pitch 18(c). During the release of a pre-determined count of discrete laminar articles i.e. the batch to the receiving face of the pusher mechanism 14 of the platform 26 (not shown in FIG. 3(a) and FIG. 3(b)), each of the discrete laminar articles belonging to the batch is held between adjacent crests of the threads on the right hand screw 16 and the left hand screw 18.

Again referring to FIG. 1 and FIG. 2, the left hand shaft 20 and the right hand shaft 22 are controlled by the servo-motor 24. The servo-motor 24 is in turn controlled by a rotary encoder (not shown in the FIG. 1 and FIG. 2) based on rpm of the left hand shaft 20 and the right hand shaft 22. When the predetermined count of discrete laminar articles such as biscuits, i.e. a batch of biscuits accumulates in the pusher mechanism 14 of the platform assembly 26, the rotary encoder sends signals to the servo-motor 24 which stop the rotation of the screws 16 and 18 and sends another signal to the pusher mechanism 14 which pushes the batch of discrete laminar articles such as biscuits received thereby to the hatch 28. The pushing of the batches of the discrete laminar articles by the pusher mechanism 14 and the starting and stopping operation of the right hand screw 16 and the left hand screw 18 by the servo motor 24 is synchronized and automated.

FIG. 1-FIG. 2 of the accompanying drawings illustrate different views of the apparatus 100 corresponding to different operational configurations of the pusher mechanism 14. More specifically, the FIG. 1 illustrates a view of the apparatus 100, wherein the pusher mechanism 14 is in a down-configuration, whereas FIG. 2 illustrates another view of the apparatus 100, wherein the pusher mechanism 14 is in an up-configuration. In the down configuration of the pusher mechanism 14, the receiving face of the pusher mechanism 14 is in line with the feed conveyor 12 to facilitate receiving of a batch of discrete laminar articles such as biscuits pushed by the left hand screw 18 and right hand screw 16 combination disposed along either side of the feed conveyor 12. Once the batch of the discrete laminar articles is received in the pusher mechanism 14, the pusher mechanism 14 moves to the up-configuration to facilitate transfer of the discrete laminar articles received thereby to the hatch 28.

FIG. 4 illustrates an isometric view of the apparatus 100 operating along a production line of discrete laminar articles such as biscuits. As the pusher mechanism 14 carrying the batch of the discrete laminar articles approaches the hatch 28, the discrete laminar articles from the batch strike a striker plate 32 that is disposed adjacent to the hatch 28. The discrete laminar articles from the batch align themselves while being in between the striker plate 32 and the pusher mechanism 14 and thereafter rebound from the striker plate 32 without getting deformed to drop through the hatch 28. The aligned articles leaving the hatch 28 are dropped to a delivery line 34 of a wrapping station, where the aligned articles are packaged to form the batch.

The method for precisely grouping discrete laminar articles such as biscuits 30 into batches of predetermined count involves receiving articles on the feed conveyor 12 from baking oven. The discrete laminar articles such as biscuits 30 are picked up by the threads of the left hand screw 18 and right hand screw 16 disposed at the edge of the feed conveyor 12 and pushed forward on to the platform 26. The passage of the discrete laminar articles through the screws 18 and 16, before the discrete laminar articles 30 leave the feed conveyor 12 facilitate in precisely counting the discrete laminar articles 30 by means of the rotary encoder. When predetermined count of discrete laminar articles accumulates in a batch, the pusher mechanism 14 pushes the batch to the hatch 28 of the platform assembly 26, from where the batch is dropped to delivery line 34 of wrapping station.

Technical Advancements and Economic Significance

The present invention provides a method and apparatus for precisely grouping discrete laminar articles such as biscuits into batches of predetermined count. The apparatus for forming batches is adapted to form batches of uniform count. The apparatus for forming batches is of a compact construction and accordingly is easy to handle and transport. Further, the apparatus for forming batches is sturdy and stable in construction. Furthermore, the apparatus for forming batches rapidly forms batches of predetermined count. Still further, the apparatus for forming batches gently handles discrete laminar articles such as biscuits without causing any damage or breakage thereof while being handled. Further, the apparatus for forming batches is adapted to handle discrete laminar articles such as biscuits of different sizes. Still further, the apparatus for forming batches is adapted to control and accurately maintain spacing between the batches. Further, the apparatus for forming batches is adapted to increases productivity. Furthermore, the apparatus for forming batches reduces work of process control and quality control departments and reduces manual monitoring and supervisory tasks. Still further, the apparatus for forming batches reduces human intervention. Furthermore, screws of different shapes and pitch may be used for handling various types of discrete laminar articles.

While considerable emphasis has been placed herein on the particular features of the preferred embodiment and the improvisation with regards to it, it will be appreciated that various modifications can be made in the preferred embodiment without departing from the principles of the invention. These and other modifications in the nature of the invention will be apparent to those skilled in the art from the disclosure herein, whereby it is to be distinctly understood that the foregoing descriptive matter is to be interpreted merely as illustrative of the invention and not as a limitation.

The invention claimed is:

1. An apparatus for grouping discrete laminar articles into batches of predetermined count, said apparatus comprising:
   a feed conveyor adapted to support and convey discrete laminar articles disposed thereon;
   a left hand screw and a right hand screw disposed along edges of either side of said feed conveyor; said left hand screw and said right hand screw adapted to rotate to facilitate counting and pushing of said discrete laminar articles, wherein said left hand screw and said right hand screw are adapted to stop rotating and thereby stop further pushing said discrete laminar articles, when a predetermined count of discrete laminar articles have been pushed;
a means for synchronizing and automating starting and stopping of rotation of said left hand screw and said right hand screw; and
a platform assembly functionally connected to said feed conveyor, said platform assembly comprising;
   a pusher mechanism adapted to receive and move said predetermined count of discrete laminar articles pushed by said left hand screw and said right hand screw; and
   a hatch adapted to receive said predetermined count of discrete laminar articles moved by said pusher mechanism and drop said predetermined count of discrete laminar articles into a delivery line of a wrapping station.

2. The apparatus as claimed in claim 1, wherein said means for synchronizing and automating starting and stopping rotation of said screws is a servo-motor.

3. The apparatus as claimed in claim 1, wherein said means for synchronizing and automating starting and stopping rotation of said screws is controlled by a rotary encoder.

4. The apparatus as claimed in claim 3, wherein said rotary encoder is adapted to send signals to means for synchronizing and automating starting and stopping rotation of said screws to stop rotation of said screws and accordingly stop further pushing of said discrete laminar articles, when a predetermined count of discrete laminar articles have been pushed from said feed conveyor to said pusher mechanism of said platform assembly.

5. The apparatus as claimed in claim 3, wherein said rotary encoder is adapted to send signals to said pusher mechanism to move said discrete laminar articles held therein to said hatch.

6. A method for grouping discrete laminar articles into batches of predetermined count, said method comprising:
   supporting and conveying discrete laminar articles on a feed conveyor;
   pushing said discrete laminar articles along said feed conveyor by rotating a left hand screw and a right hand screw disposed along edges of either side of said feed conveyor;
   stopping rotation of said left hand screw and said right hand screw and accordingly stopping further pushing of said discrete laminar articles, when a predetermined count of discrete laminar articles have been pushed to a pusher mechanism of a platform assembly functionally connected to said feed conveyor;
   synchronization and automation of starting and stopping of rotation of said left hand screw and said right hand screw; and
   moving said pre-determined count of discrete laminar articles held by the pusher mechanism to a hatch of said platform assembly;
   dropping said pre-determined count of discrete laminar articles received by the hatch into a delivery line of a wrapping station.

7. The method as claimed in claim 6, wherein said method involve controlling a means for synchronizing and automating starting and stopping of rotation of said screws by using a rotary encoder.

8. The method as claimed in claim 7, wherein said rotary encoder is also used for controlling said pusher mechanism that is adapted to move towards said hatch, after receiving said pre-determined count of discrete laminar articles.

\* \* \* \* \*